United States Patent Office 3,113,123
Patented Dec. 3, 1963

3,113,123
ALLYLIC RESINS
Charles A. Heiberger, Princeton, N.J., and James L. Thomas, Baltimore, Md., assignors to FMC Corporation, a corporation of Delaware
No Drawing. Filed Feb. 6, 1961, Ser. No. 87,125
4 Claims. (Cl. 260—45.5)

This invention relates to new polymer compositions derived from diallyl phthalate, and particularly to new thermoset resinous products having novel properties.

It is known that diallylic esters of dibasic acids, typically diallyl phthalate and related compounds, are readily polymerized in two stages: the first stage is a thermoplastic, fusible product of relatively low molecular weight, containing residual unsaturation and stable under ordinary conditions. This thermoplastic product, often called a "prepolymer," is readily further polymerized at elevated temperatures, usually in the presence of a peroxide catalyst, to form a thermoset, infusible resin.

This two-stage procedure is of particular value because most of the shrinkage which accompanies diallylic polymerizations occurs during the first stage; the second stage is then carried out in situ, accompanied by negligible shrinkage—thus maintaining the dimensional stability required particularly in such uses as the potting and encapsulating of electrical components. This negligible shrinkage during final cure is not negated by the addition of small amounts of monomer to enhance flow and facilitate completeness of cure during the second stage, and it is usual to combine minor amounts of monomeric diallyl phthalate with the prepolymer before final cure.

Diallyl phthalate resins, for their excellent mechanical and electrical properties, have found wide use in many types of applications. Nevertheless, there are always other uses for which even better properties are required, properties beyond those inherent in diallyl phthalate resins.

We have now discovered that certain mechanical properties of phthalate resins, particularly flexural strength and retention of flexural strength at elevated temperatures, are substantially increased by curing diallyl isophthalate prepolymer with a peroxide catalyst in the presence of minor amounts of diallyl maleate monomer. The flexural strengths of this combination are far superior to those obtained when either diallyl isophthalate or orthophthalate prepolymer is cured alone or in combination with minor amounts of diallyl isophthalate or orthophthalate monomer. As a result of this discovery, these compositions may be used in applications for which diallyl phthalate resins were heretofore unsuitable or deficient. This combination of substantially enhanced flexural strength and retention of flexural strength at elevated temperatures, without loss of the other excellent properties of diallyl isophthalate resins, results in products of greater utility and versatility than were heretofore available.

In accordance with this invention, diallyl isophthalate is first polymerized to form a fusible thermoplastic polymer containing residual unsaturation. This polymerization may be carried out by standard techniques, such as are described in U.S. Patent 2,273,891. A preferred method for conducting this polymerization is described in copending application Ser. No. 814,957 of C. A. Heiberger. The general procedure is to subject the diallyl isophthalate to elevated temperatures, with or without a peroxide catalyst, either undiluted or in the presence of a solvent. The polymerization reaction is continued until a portion of the monomer has been converted into thermoplastic polymer, and is discontinued before gelation of the reaction mix has occurred—normally at about 35–40% conversion of monomer to prepolymer.

The polymerization reaction may be carried out in a variety of nonaqueous media, or in the absence of any diluent. Lower aliphatic alcohols, having about 5 or less carbon atoms, and aromatic hydrocarbons such as benzene, toluene, xylene, ethylbenzene and isopropyl benzene, are effective media. The proportion of diluent may be adjusted to vary the reflux temperature, and to keep the reaction system homogeneous throughout the polymerization. As the peroxide catalyst, a wide variety of organic peroxides have been used, including tert-butyl hydroperoxide, tert-butyl perbenzoate, dicumyl peroxide, benzoyl peroxide, and many others. Hydrogen peroxide is an especially effective catalyst for this polymerization. The polymerization proceeds at temperatures ranging from about 85° to 200° C. or even higher. With peroxide catalysts, it is convenient to operate at temperatures between 105° and 120° C. under conditions of total reflux, using an organic solvent to adjust the reflux temperature. A wide range of pressures may be used, but for convenience, it is generally preferred to carry out the reaction at atmospheric pressure. The time required to complete the reaction will of course vary with these other conditions. The reaction is quenched before gelation occurs, by standard procedures such as lowering the temperature or drowning the reactants. The converted polymer is separated from unreacted monomer and residual solvent by known procedures, such as by stripping off volatile components, or dissolving unreacted monomer in an appropriate solvent. The number average molecular weight of the polymer formed by this process is normally less than 25,000, and generally below 10,000. The product is a solid, thermoplastic polymer containing residual unsaturation, and is readily polymerized further to form a cross-linked, thermoset resin. The preparation of the fusible prepolymer is illustrated in the following example.

*Example 1*

Diallyl isophthalate was polymerized as follows: 100 parts of diallyl isophthalate monomer was mixed with 0.15 part of tert-butyl hydroperoxide and 0.086 part of hydrogen peroxide and heated with stirring at 120° C. for 7.5 hours at which point the reaction mass had reached a viscosity of 350 cps. at 25° C. The polymer was precipitated with methanol, separated and dried to give a 22% yield of solid resin, having a softening range of 55–95° C. and iodine number of 64.

The prepolymers may be formulated as molding powders, laminating solutions, premixes, etc., depending on the desired end use. Standard recipes may be used. Molding powders may contain the usual fillers and reinforcing agents. Laminating solutions are readily prepared, since the thermoplastic prepolymers are readily soluble in low molecular weight ketones, benzene ethyl acetate and other solvents.

For the beneficial results of this invention, about 5% to 25% of diallyl maleate, by weight of total resin, is included with the diallyl isophthalate prepolymer. A catalytic amount of a peroxide catalyst is also usually included, for more rapid cure at a lower temperature than if the final cure were thermally induced. Useful catalysts for this step include organic peroxides and hydroperoxides such as benzoyl peroxide and tertiary-butyl hydroperoxide, inorganic peroxides such as hydrogen peroxide and sodium peroxide, di(tertiary alkyl)peroxides such as dicumyl peroxide, and mixtures thereof, as well as many other catalysts which have been described in the literature. Such catalysts are used in the proportion of 0.01 to 10 percent depending on the efficiency of their action and whether or not substances which inhibit polymerization are present in the mixture to be cross-linked. Other additives, such as internal release agents, dyes, pigments and other agents used to impart particular properties, may be present.

The following examples illustrate the novel compositions of this invention. All parts are by weight. Mechanical and electrical properties are determined by standard ASTM methods.

*Example 2*

With 90 parts of the diallyl isophthalate prepolymer prepared in Example 1 were blended 10 parts diallyl maleate and 3 parts tert-butyl perbenzoate in a Hobart food mixer. The blend was compression molded, in bars 5" x ¼" x ½" for 15 minutes at 150° C. and 8000 p.s.i., and postcured for 12 hours at 115° C. The product thus obtained had the following properties. For comparison, results of an identical procedure, but replacing the diallyl maleate with diallyl isophthalate, are included:

| Property | Diallyl Isophthalate Prepolymer with— | |
|---|---|---|
|  | 10% Diallyl Maleate | 10% Diallyl Isophthalate |
| Flexural strength at 73° F., p.s.i. | 7,200 | 5,400 |
| Flexural strength at 300° F., p.s.i. | 4,100 | 2,000 |
| Flexural modulus at 73° F., p.s.i. × 10⁵ | 0.51 | 0.52 |
| Flexural modulus at 300° F., p.s.i. × 10⁵ | 0.27 | 0.27 |
| Heat Distortion Temp. at 264 p.s.i., °C. | 195 | 195 |
| Rockwell Hardness, M scale | 122 | 122 |

*Example 3*

A laminating solution was prepared as follows: 425 parts of the diallyl isophthalate prepolymer prepared in Example 1, 75 parts of diallyl maleate and 18 parts t-butyl perbenzoate were dissolved in 410 parts of methyl isobutyl ketone. Twelve plies of No. 181 Garan finish glass cloth were impregnated with this mixture, dried at 250° F. for 5 minutes to a resin content of 49%, pressed at 100 p.s.i. and 285° F. for 30 minutes, and postcured one hour at 300° F. The laminate thus produced had the following physical properties.

Property:
Flexural strength at 73° F., p.s.i. _____ 45,450
Flexural strength after 30 min. at 400° F., p.s.i. _____ 40,400
Flexural strength after 100 hrs. at 400° F., p.s.i. _____ 34,600
Flexural modulus at 73° F., p.s.i.×10⁶ ____ 1.3
Flexural modulus after 30 min. at 400° F., p.s.i.×10⁶ _____ 1.96
Flexural modulus after 100 hrs. at 400° F., p.s.i.×10⁶ _____ 1.22

The relatively high retention of flexural properties of these laminates, after severe treatment at elevated temperatures, is apparent from the above data.

Although the present invention has been described with reference to the specific details of certain embodiments thereof, it is not intended that such details shall be regarded as limitations upon the scope of this invention except insofar as included in the accompanying claims.

We claim:

1. A polymerizable mixture comprising a thermoplastic polymer of diallyl isophthalate, which polymer contains residual allylic unsaturation and is capable of further polymerization, and about 5% to 25% of diallyl maleate monomer, by weight of the total mixture of said polymer and monomer.

2. A polymerizable mixture comprising a thermoplastic polymer of diallyl isophthalate, which polymer contains residual allylic unsaturation and is capable of further polymerization, about 5% to 25% of diallyl maleate monomer, by weight of the total mixture of said polymer and monomer, and a catalytic amount of an organic peroxide.

3. The thermoset resinous composition obtained by curing the polymerizable mixture of claim 2.

4. A thermoset resinous composition derived from a thermoplastic polymer of diallyl isophthalate, which polymer contains residual allylic unsaturation and is capable of further polymerization, and about 5% to 25% of diallyl maleate monomer, by weight of the total mixture of said polymer and monomer.

References Cited in the file of this patent

UNITED STATES PATENTS 2,595,852 Hopper et al. _____ May 6, 1952
2,623,025 Dearing et al. _____ Dec. 23, 1952
2,990,338 Johnston et al. _____ June 7, 1961

UNITED STATES PATENT OFFICE

CERTIFICATE OF CORRECTION

Patent No. 3,113,123                                      December 3, 1963

Charles A. Heiberger et al.

It is hereby certified that error appears in the above numbered patent requiring correction and that the said Letters Patent should read as corrected below.

Column 2, line 3, for "35-40%" read -- 25-40% --.

Signed and sealed this 12th day of May 1964.

(SEAL)
Attest:
ERNEST W. SWIDER

Attesting Officer

EDWARD J. BRENNER
Commissioner of Patents